United States Patent
Yoon et al.

(10) Patent No.: US 10,227,510 B2
(45) Date of Patent: Mar. 12, 2019

(54) OPTICAL ADHESIVE FILM, METHOD FOR MANUFACTURING OPTICAL ADHESIVE FILM AND TOUCH SCREEN PANEL COMPRISING SAME

(71) Applicant: LG Chem, Ltd., Seoul (KR)

(72) Inventors: Chan Oh Yoon, Cheongju-si (KR); Sung Chan Park, Seoul (KR); Jang Soon Kim, Seongnam-si (KR); Eun Kyung Park, Seoul (KR); Bu Gi Jung, Anyang-si (KR); Won Ho Kim, Seoul (KR)

(73) Assignee: LG Chem, Ltd. (KR)

( * ) Notice: Subject to any disclaimer, the term of this patent is extended or adjusted under 35 U.S.C. 154(b) by 221 days.

(21) Appl. No.: 14/899,122

(22) PCT Filed: Jun. 27, 2014

(86) PCT No.: PCT/KR2014/005770
§ 371 (c)(1),
(2) Date: Dec. 17, 2015

(87) PCT Pub. No.: WO2014/209074
PCT Pub. Date: Dec. 31, 2014

(65) Prior Publication Data
US 2016/0145473 A1 May 26, 2016

(30) Foreign Application Priority Data

Jun. 28, 2013 (KR) .......................... 10-2013-0075144

(51) Int. Cl.
*C09J 133/08* (2006.01)
*C09J 11/04* (2006.01)
(Continued)

(52) U.S. Cl.
CPC .......... *C09J 133/08* (2013.01); *C08F 220/18* (2013.01); *C09J 7/10* (2018.01); *C09J 11/04* (2013.01);
(Continued)

(58) Field of Classification Search
CPC .................. C08K 2201/011; C08K 3/346; C08K 5/5415; C08K 7/10; C09J 11/04;
(Continued)

(56) References Cited

U.S. PATENT DOCUMENTS 8,268,227 B2 * 9/2012 Chen .................... G02B 5/3083
264/494
8,557,084 B2 10/2013 Keite-Telgenbuscher et al.
(Continued)

FOREIGN PATENT DOCUMENTS

CN 102906207 A 1/2013
EP 2110422 A1 10/2009
(Continued)

OTHER PUBLICATIONS

JP 2005344008 A, Dec. 2005, Machine translation.*
(Continued)

*Primary Examiner* — Satya B Sastri
(74) *Attorney, Agent, or Firm* — Lerner, David, Littenberg, Krumholz & Mentlik, LLP

(57) ABSTRACT

The present invention relates to an optical adhesive film including plate-type inorganic nanoparticles and a curable resin. The optical adhesive film has improved barrier characteristics to moisture and gas, improved light-transmittance, and excellent durability and peel characteristics.

13 Claims, 4 Drawing Sheets

(51) Int. Cl.
  *C09J 133/14* (2006.01)
  *G06F 3/041* (2006.01)
  *C09J 7/10* (2018.01)
  *C08F 220/18* (2006.01)
  *C09J 133/06* (2006.01)
  *C08K 3/34* (2006.01)
  *C08K 7/10* (2006.01)
  *C08K 5/5415* (2006.01)

(52) U.S. Cl.
  CPC ........ *C09J 133/066* (2013.01); *G06F 3/041* (2013.01); *C08K 3/346* (2013.01); *C08K 5/5415* (2013.01); *C08K 7/10* (2013.01); *C08K 2201/011* (2013.01); *C09J 2201/122* (2013.01); *C09J 2201/606* (2013.01); *C09J 2203/318* (2013.01); *C09J 2205/102* (2013.01); *C09J 2433/00* (2013.01); *C09J 2467/006* (2013.01)

(58) Field of Classification Search
  CPC ............... C09J 133/08; C09J 2201/122; C09J 2201/606; C09J 2203/318; C09J 2205/102; C09J 2433/00; C09J 2467/006; C09J 7/00; C09J 7/02; G06F 3/041
  See application file for complete search history.

(56) References Cited

U.S. PATENT DOCUMENTS

| | | | |
|---|---|---|---|
| 2002/0150729 A1 | 10/2002 | Mueller et al. | |
| 2009/0017298 A1* | 1/2009 | Okada | C08K 3/346 428/354 |
| 2010/0323151 A1* | 12/2010 | Terada | C09J 7/0207 428/119 |
| 2011/0036494 A1 | 2/2011 | Keenihan et al. | |
| 2013/0004695 A1 | 1/2013 | Kim et al. | |
| 2014/0322526 A1* | 10/2014 | Dollase | C03C 27/10 428/337 |
| 2014/0349055 A1 | 11/2014 | Kim et al. | |

FOREIGN PATENT DOCUMENTS

| | | | |
|---|---|---|---|
| EP | 2810999 A1 | | 12/2014 |
| JP | 2005344008 A | * | 12/2005 |
| KR | 100444412 B1 | | 11/2004 |
| KR | 20100077798 A | | 7/2010 |
| KR | 20110111825 A | | 10/2011 |
| TW | 200846438 A | | 12/2008 |
| WO | 0187566 A1 | | 11/2001 |

OTHER PUBLICATIONS

Extended European Search Report dated May 31, 2016 in connection with the counterpart European Patent Application No. 14818577.0-1308, citing the above reference(s).

Lan, Tie "Nanomer nanoclay as flame retardation additives" Nanocor Inc. 2007, 15 pages, Airington Heights, USA.

International Search Report Application No. PCT/KR2014/005770 dated Oct. 6, 2014, citing the above references.

Chinese Search Report for Application No. 201480037210.6 dated Jun. 2, 2017.

* cited by examiner

OPTICAL ADHESIVE FILM, METHOD FOR MANUFACTURING OPTICAL ADHESIVE FILM AND TOUCH SCREEN PANEL COMPRISING SAME

CROSS REFERENCE TO RELATED APPLICATION

This application claims the priority of Korean Patent Application No. 10-2013-0075144, filed on Jun. 28, 2013 in the KIPO (Korean Intellectual Property Office). Further, this application is the National Phase application of International Application No. PCT/KR2014/005770 filed Jun. 27, 2014, which designates the United States and was published in Korean.

TECHNICAL FIELD

The present invention relates to an optical adhesive film, a method for manufacturing the optical adhesive film, and a touch screen panel comprising same.

BACKGROUND ART

Recently, electronic devices such as personal digital assistants (PDAs), mobile communication terminals, vehicle navigations, and the like, form a large market. When the electronic devices are equipped with a touch screen or a touch panel switch in an input operation part, a transparent conductive plastic film is used for light weight, breakage prevention, and the like. An example of the transparent conductive plastic film includes a transparent conductive film having a polyethylene terephthalate (PET) film as a substrate, and having a conductive layer such as an indium tin oxide (ITO) formed on one surface of the PET film, wherein the transparent conductive film is stacked on a conductive glass, a reinforcement material, a decorative film, and the like, by an adhesive layer.

DISCLOSURE

Technical Problem

It is an aspect of the present invention to provide an optical adhesive film having improved barrier characteristics to moisture and gas.

It is another aspect of the present invention to provide a method for manufacturing the optical adhesive film.

It is still another aspect of the present invention to provide a touch screen panel comprising the optical adhesive film.

Technical Solution

In accordance with one aspect of the present invention, an optical adhesive film includes: plate-type inorganic nanoparticles; and a curable resin.

The plate-type inorganic nanoparticles may have a plate shape in which a thickness is about 1 nm to about 100 nm.

The plate-type inorganic nanoparticles may have a ratio of a thickness to a long diameter in a plate shape of about 1:50 to about 1:200.

The plate-type inorganic nanoparticles may include at least one layer constituting a layered clay compound.

In the layered clay compound, a hydrophilic functional group may be substituted with a C12-C18 alkyl group.

The layered clay compound may include one selected from the group consisting of mica, smectite, vermiculite, chlorite, montmorillonite (MMT), nontronite, saponite, hectorite, bentonite and combinations thereof.

The curable resin may be an acrylic photo-curable resin polymerized with a monomer including one selected from the group consisting of 2-ethyl hexyl acrylate (2-EHA), isobornyl acrylate (IBOA), hydroxy ethyl acrylate (HEA), hydroxyl butyl acrylate (HBA), hydroxy propyl acrylate (HPA), hexyl methacrylate (HMA), and combinations thereof.

In the layered clay compound, a hydrophilic functional group of the above exemplified layered clay compound may be substituted with a C12-C18 alkyl group.

The curable resin may have an amount of 100 parts by weight and the layered clay compound may have an amount of about 1 to about 20 parts by weight.

The layered clay compound may be dispersed in a matrix of the curable resin being disposed parallel to a surface of the optical adhesive film.

Peaks may do not exist at 2θ values of about 2 to about 10 degrees in X-ray diffraction (XRD) pattern using CuKα ray.

A transmittance may be about 91 to about 93%, and water vapor transmission rate (WVTR) value of the optical adhesive film after being left at about 50° C. for about 24 hours may be about 10 gmm/m² to 80 gmm/m².

A toughness may be about 2.0 Kg/mm² to about 5.0 Kg/mm², modulus measured at room temperature may be about $0.5 \times 10^5$ Pa to about $1.3 \times 10^5$ Pa, and peel strength may be about 2.0 kg/inch to about 3.5 kg/inch.

In accordance with another aspect of the present invention, a method for manufacturing an optical adhesive film includes: preparing an adhesive composition by mixing an organic-substituted hydrophobic layered clay compound and a curable monomer for forming an optical adhesive film so that the curable monomer is interposed between layers of the layered clay compound; and curing the adhesive composition to polymerize the curable monomer interposed between the layers of the layered clay compound to be a curable resin, such that the plate-type inorganic nanoparticles, each of which forms the layer of the layered clay compound, are delaminated so as to obtain the optical adhesive film in which plate-type inorganic nanoparticles are dispersed in a matrix of the curable resin.

The layered clay compound and the curable monomer may be stirred and mixed at about 500 to about 10,000 rpm for about 5 to about 60 minutes.

The organic-substituted hydrophobic layered clay compound may include one selected from the group consisting of mica, smectite, vermiculite, chlorite, montmorillonite (MMT), nontronite, saponite, hectorite, bentonite and combinations thereof, and in the layered clay compound, a hydrophilic functional group may be substituted with a C12-C18 alkyl group.

In accordance with still another aspect of the present invention, a touch screen panel includes: a conductive plastic film having one surface on which a conductive layer is formed; and the optical adhesive film as described above, stacked on the conductive plastic film.

The conductive plastic film may be a polyethylene terephthalate film having one surface on which an indium tin oxide (ITO) (conductive metal oxide) layer is formed.

The optical adhesive film has improved barrier characteristics to moisture and gas, improved light-transmittance, and excellent durability and peel characteristics.

BEST MODE

Figure 1A:
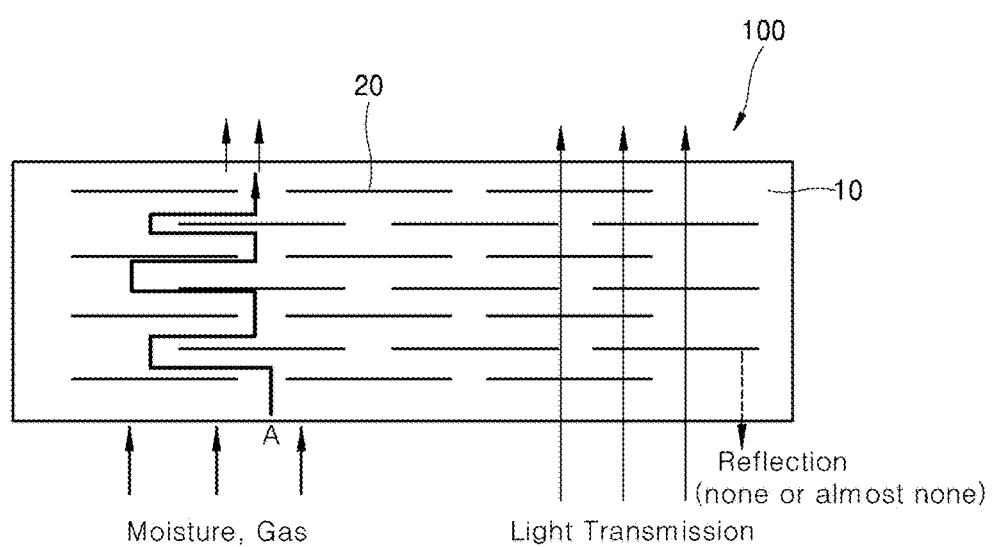
FIGS. 1A and 1B are schematic views illustrating a cross section of an optical adhesive film according to an exemplary embodiment of the present invention and a cross section of an optical adhesive film that does not include plate-type inorganic nanoparticles, respectively.

Hereinafter, exemplary embodiments of the present invention will be described in detail. However, these exemplary embodiments are only provided by way of example, and the present invention is not limited to these exemplary embodiments. Therefore, the present invention will be defined only by the scope of the appended claims.

The description of parts deviating from the subject matter of the present invention will be omitted. Like reference numerals designate like elements throughout the specification.

In the drawings, thicknesses of various layers and regions are exaggerated for clarity. In the drawings, thicknesses partial layers and regions are exaggerated for convenience of explanation.

Hereinafter, formation of any configuration in "an upper part (or a lower part) or "on (or below)" of a substrate means that any configuration is formed while contacting an upper surface (or a lower surface) of the substrate, and is not limited to exclude other constitution between the substrate and any configuration formed on (or below) the substrate.

In an exemplary embodiment of the present invention, there is provided an optical adhesive film including plate-type inorganic nanoparticles; and a curable resin.

The plate-type inorganic nanoparticles may have a plate shape in which a thickness is about 1 nm to about 100 nm, and may be included in the optical adhesive film to reinforce physical properties.

The plate-type inorganic nanoparticles may have a ratio of a thickness to a long diameter in a plate shape of about 1:50 to about 1:200. The optical adhesive film may include the plate-type inorganic nanoparticles having the above-described range of shape ratio, such that moisture penetration flow path having an appropriate length may be secured, thereby having excellent gas barrier characteristic and excellent dispersibility.

The optical adhesive film may have improved barrier characteristics to moisture and gas. In an exemplary embodiment, the plate-type inorganic nanoparticles may be dispersed while being aligned to be parallel to a surface of the optical adhesive film, so that the barrier characteristics may be more improved. The above description may be implemented by a method for manufacturing the optical adhesive film to be described below.

Figure 1B:
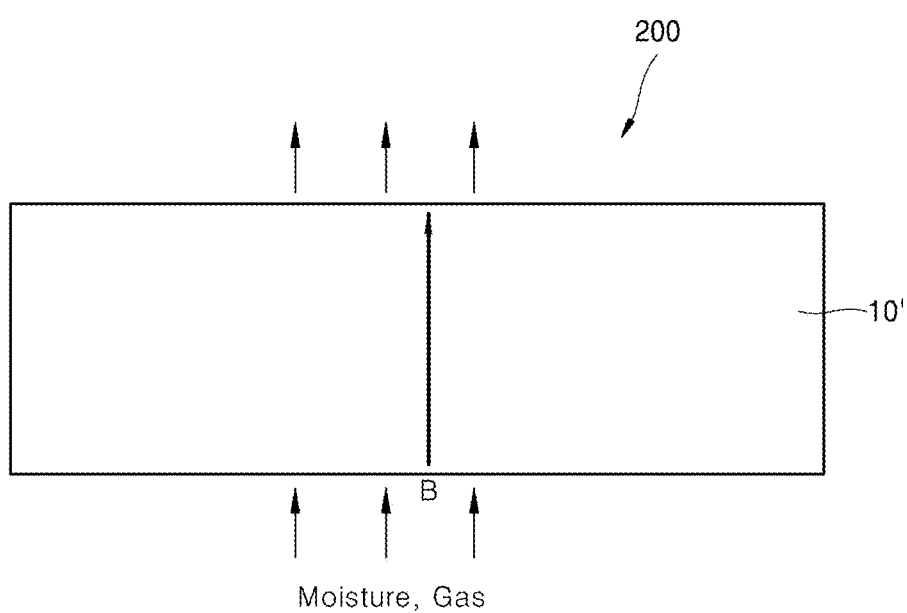

FIGS. 1A and 1B are diagrams illustrating cross sections of the optical adhesive film. In FIG. 1A, the optical adhesive film 100 includes the plate-type inorganic nanoparticles 20, such that a flow path (A) of moisture and gas is longer than a flow path (B) of an optical adhesive film 200 that does not include the plate-type inorganic nanoparticles illustrated in FIG. 1B, thereby improving barrier characteristics to moisture and gas.

In an exemplary embodiment, a water vapor transmission rate (WVTR) value of the optical adhesive film after being left at about 50° C. for about 24 hours may be about 10 $gmm/m^2$ to 80 $gmm/m^2$.

When the optical adhesive film is applied to a touch screen panel, the optical adhesive film may be stacked together with a conductive plastic film, wherein a conductive material, for example, indium tin oxide (ITO) may be oxidized by moisture and gas to be penetrated. Since the optical adhesive film has improved barrier characteristics to moisture and gas as described above, an oxidation reaction of the conductive material, for example, ITO in the conductive plastic film stacked together when the optical adhesive film is applied to the touch screen panel may be inhibited.

When the plate-type inorganic nanoparticles are included in the optical adhesive film, curing properties of the curable resin may not be inhibited, and a plate thickness of the plate-type inorganic nanoparticles is a nano size, such that constructive interference of light may be induced while not reducing transmittance of light, thereby reducing reflectivity to induce improvement in transmittance. In an exemplary embodiment, the optical adhesive film may maintain transmittance to be about 91 to about 93%.

The optical adhesive film may include the plate-type inorganic nanoparticles, such that the nanoparticles may be dispersed to provide excellent elongation property, and high cohesion, thereby implementing an optical adhesive film in which residue is not left at the time of being removed. That is, the optical adhesive film may have increased mechanical strength such as strength, modulus, and the like, and improved thermal stability and peel strength. In an exemplary embodiment, the optical adhesive film may have a toughness of about 2.0 $Kg/mm^2$ to about 5.0 $Kg/mm^2$, modulus measured at room temperature of about $0.5\times10^5$ Pa to about $1.3\times10^5$ Pa, and peel strength of about 2.0 kg/inch to about 3.5 kg/inch.

The optical adhesive film may include the curable resin and a layered clay compound, wherein the curable resin may have an amount of 100 parts by weight, and the layered clay compound may have an amount of about 0.1 to about 20 parts by weight, specifically, about 0.1 to about 10 parts by weight. Within the above-described content ratio of the curable resin and the layered clay compound, balance of the physical properties of the optical adhesive film as described above may be obtained.

The plate-type inorganic nanoparticles may be formed from at least one layer constituting the layered clay compound.

The optical adhesive film may be formed as follows. An adhesive composition may be prepared by mixing an organic-substituted hydrophobic layered clay compound with a curable monomer for forming an optical adhesive film so that the curable monomer is interposed between layers of the layered clay compound. Then, by curing the adhesive composition, the curable monomer interposed between the layers of the layered clay compound may be polymerized to be a curable resin, such that volume thereof may be increased, whereby layers of the layered clay compound may be delaminated. Accordingly, the delaminated layers of the layered clay compound may be dispersed in a matrix of the curable resin, thereby forming the optical adhesive film.

Since the delaminated layers of the layered clay compound are the plate-type inorganic nanoparticles, the optical adhesive film is formed where the plate-type inorganic nanoparticles are dispersed in the matrix of the curable resin.

Accordingly, the plate-type inorganic nanoparticles may include at least one layer constituting the layered clay compound.

In another exemplary embodiment of the present invention, there is provided a method for manufacturing an optical adhesive film including: preparing an adhesive composition by mixing an organic-substituted hydrophobic layered clay compound and a curable monomer for forming an optical adhesive film so that the curable monomer is interposed between layers of the layered clay compound; and curable resin by curing the adhesive composition to polymerize the curable monomer interposed between the layers of the layered clay compound to be a curable resin, such that the plate-type inorganic nanoparticles, each of which forms the layer of the layered clay compound, are delaminated so as to obtain the optical adhesive film in which plate-type inorganic nanoparticles are dispersed in a matrix of the curable resin.

In order to excellently implement the above-described physical properties of the optical adhesive film, that is, mechanical strength such as strength, modulus, and the like, thermal stability, peel strength, and the like, the plate-type inorganic nanoparticles obtained by exfoliation of the layers of the layered clay compound are required to be well dispersed in the matrix of the curable resin.

In order to well disperse the exfoliated plate-type inorganic nanoparticles from the layered clay compound in the matrix of the curable resin, the curable monomers are required to be well mixed among the layers of the layered clay compound. For example, the layered clay compounds and the curable monomers may be stirred and mixed at about 500 to about 10,000 rpm for about 5 to about 60 minutes.

For example, the layered clay compound may include one selected from the group consisting of mica, smectite, vermiculite, chlorite, montmorillonite (MMT), nontronite, saponite, hectorite, bentonite and combinations thereof.

In order to modify the layered clay compound to have hydrophobicity, a hydrophilic functional group contained therein is substituted with a substituent providing hydrophobicity, for example, a C12-C18 alkyl group, thereby obtaining a layered clay compound having organic-substituted hydrophobicity.

Then, when the layered clay compound having organic-substituted hydrophobicity is mixed with the curable monomers, the curable monomers are interposed between the layers of the layered clay compound. Then, when the curable monomers interposed between the layers of the layered clay compound are cured, the curable monomers are polymerized to be a curable resin having a three-dimensional network structure as described above, such that volume thereof may be increased, whereby interval between the layers of the layered clay compound may be increased, and accordingly, the layers may be delaminated.

Depending on the interval between the delaminated layers, it may be observed that adhesive properties, optical properties, mechanical properties, and the like, may be improved, or changed. A state in which the layers are completely separated refers to an exfoliation state, wherein transparent optical properties may be obtained, and reinforcement effects may be obtained according to the shape ratio, such that mechanical physical properties including tensile strength of the adhesive film may be improved by about 5 to about 20% or more. In addition, as the shape ratio becomes increased, a path through with gas particles pass is also increased, thereby improving barrier characteristics.

The interval between the delaminated layers is relevant to a degree of dispersion of the plate-type inorganic nanoparticles in the optical adhesive film, and has an effect on peak positions in XRD measurement. In an exemplary embodiment, it may be observed that the peak values do not exist at $2\theta$ values of about 2 to about 10 degrees in X-ray diffraction (XRD) pattern using CuK$\alpha$ ray on the optical adhesive film. It means that the dispersion is well achieved.

In the optical adhesive film manufactured as described above, the layered clay compound may be dispersed with orientation in the matrix of the curable resin.

Figure 2:
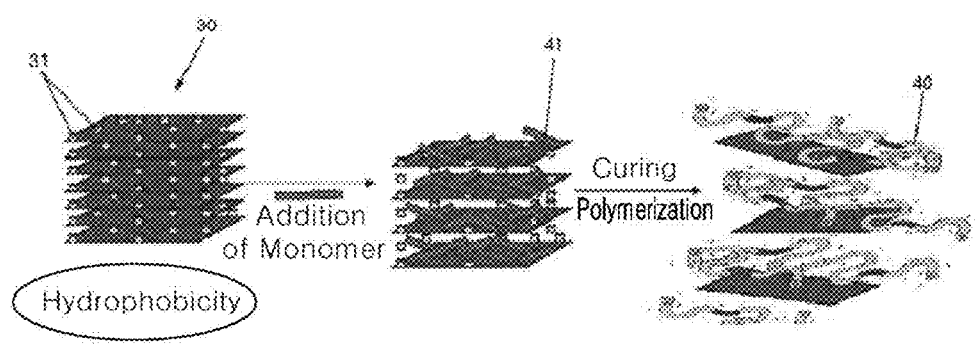
FIG. 2 is a view schematically illustrating a flow of a method for manufacturing an optical adhesive film according to another exemplary embodiment of the present invention.

FIG. 2 is a view schematically illustrating a flow of a method for manufacturing the optical adhesive film as described above.

The optical adhesive film may be effectively applied to a screen, a panel, and the like, of a display device, and the curable monomer may have composition known in the art to be formed as an optically clear adhesive layer (OCA).

Specifically, the curable resin may be an acrylic photocurable resin polymerized with a monomer including one selected from the group consisting of 2-ethyl hexyl acrylate (2-EHA), isobornyl acrylate (IBOA), hydroxy ethyl acrylate (HEA), hydroxyl butyl acrylate (HBA), hydroxy propyl acrylate (HPA), hexyl methacrylate (HMA), methyl acrylate, butyl acrylate, methyl methacrylate and combinations thereof, and may be polymerized by further including a photoinitiator, a curing agent, other additives, and the like, in an adhesive composition including the monomer at the time of polymerization.

The adhesive composition may form the matrix of the curable resin, for example, by photocuring by light irradiation such as UV. Instead of using the photocurable monomer, a thermosetting monomer may be used and heat-cured to form a matrix of a thermosetting resin.

Since the optical adhesive film is formed by adhesive layers having adhesion force, a surface of the optical adhesive film may have a hydroxy group, a carbonyl group, an aldehyde group, a halo-formyl group, a carbonate ester group, a carboxylate group, a carboxyl group, an ester group, a hydroperoxide group, a peroxy group, an ether group, a hemiketal group, an acetal group, an ortho ester group, an ortho carbonate ester group, a carboxylic acid group, an amide group, an amine group, an imine group, an azide group, an azo compound group, a cyanate group, a nitrate group, a nitrile group, a nitro compound group, a nitroso compound group, a thiol group, a sulfonic acid or combinational function groups thereof.

Since the photocuring reaction is usually generated by ring-opening of a double bond, the majority of functional groups are naturally present in an unreacted state in most cases, and in the case of heat-curing, there are many cases where the functional groups participate in the curing reaction, wherein in some cases, a curing agent has a relatively small amount in order to leave the functional groups.

In another exemplary embodiment of the present invention, there is provided a touch screen panel including: a conductive plastic film having one surface on which a conductive layer is formed; and the optical adhesive film as described above, stacked on the conductive plastic film.

For example, the touch screen panel may be a capacitive-type touch panel. In addition, a specific structure of the touch screen panel or a method for forming the touch screen panel is not specifically limited as long as the above-described optical adhesive film is applied, but laminate configurations of general multilayer structures in the art may be employed to the specific structure or the method.

The optical adhesive film may be the same as the above-described optical adhesive film, and detailed description thereof is the same as described above.

In an exemplary embodiment, the optical adhesive film may be an optical adhesive film manufactured as described above so that a transmittance is about 91 to about 93%, and a water vapor transmission rate (WVTR) value of the optical adhesive film after being left at about 50° C. for about 24 hours is about 10 gmm/m$^2$ to 80 gmm/m$^2$.

Specific kinds of the conductive plastic film are not particularly limited, and the conductive plastic film may be any conductive plastic film known in the art. For example, the conductive plastic film may be a transparent plastic film having one surface on which an indium tin oxide (ITO) electrode layer is formed. Specifically, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, a polyimide film, and the like, may be used as the transparent plastic film forming the plastic substrate layer, but the present invention is not limited thereto. More specifically, the plastic substrate film may be a polyethylene terephthalate (PET) film.

Hereinafter, Examples and Comparative Examples of the present invention will be described. However, the following Examples are only provided as one exemplary embodiment of the present invention, and the present invention is not limited to the following Examples.

EXAMPLES

Example 1

An adhesive composition was prepared by mixing 100 parts by weight of 2-ethyl hexyl acrylate (2-EHA), 50 parts by weight of isobornyl acrylate (IBOA), and 40 parts by weight of hydroxyethyl acrylate (HEA), and adding 1-hydroxy cyclohexyl phenyl ketone (Irgacure 184, HCPK) as a photoinitiator and a coupling agent as another additive to the mixture. Then, the adhesive composition was mixed with 1 part by weight of organic-substituted organoclay [Southern Clay Products (USA), Cloisite 10A, thickness: 1 nm, a ratio of a thickness to a long diameter in a plate shape of 1:100) and well-mixed at 10,000 rpm for 30 minutes using Homogenizer X360 (CAT, Germany), thereby preparing a coating liquid of the adhesive composition. The coating liquid was applied onto a release-treated polyethylene terephthalate film (thickness: 75 μm) using a bar coater so that an adhesive layer has a thickness of 100 μm, and cured by irradiation with ultraviolet rays for 10 minutes using an UV lamp, thereby manufacturing an adhesive film.

As results obtained by measuring X-ray diffraction (XRD) pattern using CuKα ray on the adhesive film, peak values were disappeared at 2θ values of about 2 to about 10 degrees.

Example 2

An adhesive film was manufactured by the same method as Example 1 above except for using 3 parts by weight of organoclay.

As results obtained by measuring X-ray diffraction (XRD) pattern using CuKα ray on the adhesive film, peak values were disappeared at 2θ values of about 2 to about 10 degrees.

Example 3

An adhesive film was manufactured by the same method as Example 1 above except for using 5 parts by weight of organoclay.

As results obtained by measuring X-ray diffraction (XRD) pattern using CuKα ray on the adhesive film, peak values were disappeared at 2θ values of about 2 to about 10 degrees.

Example 4

A coating liquid was prepared by the same method as Example 1 above, and an adhesive film was manufactured by the same method as Example 2 except that the mixing was performed at 10,000 rpm for 5 minutes using Homogenizer X360 (CAT, Germany).

Example 5

A coating liquid was prepared by the same method as Example 1 above, and an adhesive film was manufactured by the same method as Example 3 except that the mixing was performed at 1,000 rpm for 30 minutes using Homogenizer X360 (CAT, Germany).

Comparative Example 1

An adhesive film of Comparative Example 1 was manufactured by the same method as Example 1 except that organoclay which is plate-type inorganic nanoparticles was not included.

Table 1 summarizes main compositions forming the adhesive films of Examples 1 to 5 and Comparative Example 1.

TABLE 1

| Classification | EHA Content (Parts by Weight) | IBOA Content (Parts by Weight) | HEA Content (Parts by Weight) | Plate-Type Inorganic Nanoparticles (Organoclay) Content (Parts by Weight) |
|---|---|---|---|---|
| Example 1 | 100 | 50 | 40 | 1 |
| Example 2 | 100 | 50 | 40 | 3 |
| Example 3 | 100 | 50 | 40 | 5 |
| Example 4 | 100 | 50 | 40 | 3 |
| Example 5 | 100 | 50 | 40 | 5 |
| Comparative Example 1 | 100 | 50 | 40 | 0 |

Evaluation

Experimental Example 1

Figure 3:
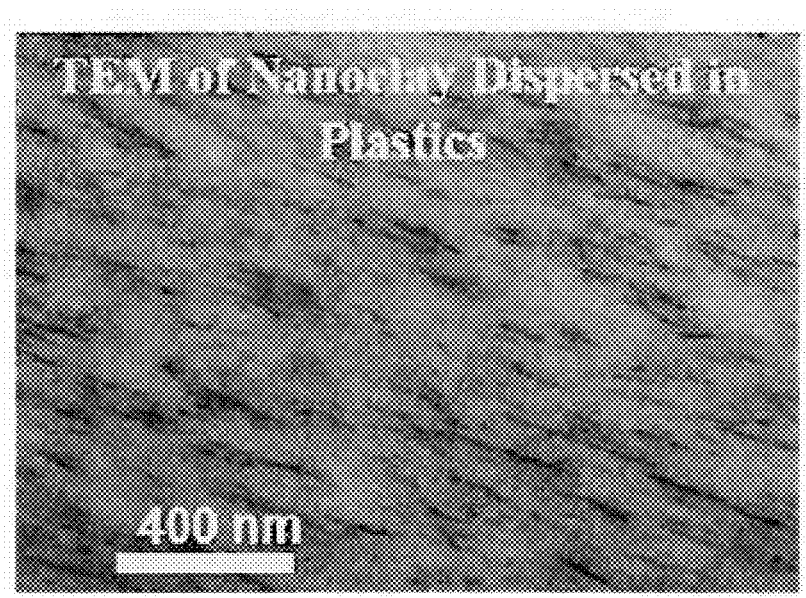
FIG. 3 is a transmission electrode microscope (TEM) image of an optical adhesive film manufactured by Example 1.

A transmission electrode microscope (TEM) image of the optical adhesive film manufactured by Example 1 above was taken. FIG. 3 is a TEM image of the optical adhesive film manufactured by Example 1. It could be confirmed that the plate-type inorganic nanoparticles were arranged with orientation in the optical adhesive film.

Experimental Example 2

Evaluation of Optical Properties

Total light transmittance and haze of the optical adhesive films of Examples 1 to 5 and Comparative Example 1 were measured according to ASTM D 1003 Modified method using CM-5 (Konica Minolta, Inc.), and results thereof were shown in Table 2 below.

Total transmittance means a total light transmittance including both of straight beam and scattered beam of incident light. The total transmittance was measured by attaching the optical adhesive films of Examples 1 to 5 and Comparative Example 1 on a glass, and was shown by the following Equation 1 with the baseline being air and 100% based correction data:

(transmittance of a laminate of glass/OCA)/transmittance of air*100  [Equation 1]

Reflectivity at an interface of the glass and the OCA was not corrected.

The optical adhesive films of Examples 1 to 3 had significantly excellent transmittance and haze properties.

Experimental Example 3

Water Vapor Transmission Rate (WVTR)

Water vapor transmission rate (WVTR) was measured by PERMATRAN_W 3/33 MA (MOCON Inc.) in accordance with ASTM E96.

Experimental Example 4

Measurement of Durability

Tensile strength was measured by Texture Analyzer (TA Plus, Texture Technologies Corp.,) in accordance with ASTM D3759.

Experimental Example 5

Measurement of Peel Strength

Peel strength of the optical adhesive films of Examples 1 to 3 was measured at a rate of about 300 mm/min to a width (inch).

Peel strength was measured by Texture Analyzer (TA Plus, Texture Technologies Corp.,) in accordance with ASTM D3330.

The measured physical properties were shown in the following Table 2.

TABLE 2

| | Transmittance (%) | Water Vapor Transmission Rate (WVTR) (g/(m²·day)) | Toughness (kg) | Modulus (Pa, Room Temperature) | Peel Strength (kg/inch) | Haze |
|---|---|---|---|---|---|---|
| Example 1 | 92.5 | 70 | 3.0 | $1.10 \times 10^5$ | 2.5 | 0.4 |
| Example 2 | 92.0 | 50 | 3.5 | $1.15 \times 10^5$ | 3.0 | 0.5 |
| Example 3 | 91.5 | 30 | 4.0 | $1.20 \times 10^5$ | 3.5 | 0.6 |
| Example 4 | 90.0 | 90 | 3.1 | $1.1 \times 10^5$ | 2.4 | 1.0 |
| Example 5 | 89.0 | 80 | 3.5 | $1.15 \times 10^5$ | 2.7 | 1.3 |
| Comparative Example 1 | 92.5 | 100 | 2.6 | $1.0 \times 10^5$ | 2.1 | 0.3 |

From the results of Table 2 above, it was confirmed that Examples 1 to 5 had optical properties and physical properties that were suitable for desirable optical usage.

DETAILED DESCRIPTION OF MAIN ELEMENTS

10: CURABLE RESIN MATRIX
20: PLATE-TYPE INORGANIC NANOPARTICLES
100, 200: OPTICAL ADHESIVE FILM

The invention claimed is:

1. An optical adhesive film comprising:
inorganic nanoparticles having a plate shape; and
a cured resin, wherein the inorganic nanoparticles include at least one delaminated layer of a layered clay compound, and the inorganic nanoparticles are dispersed in a matrix of the cured resin, parallel to a surface of the optical adhesive film,
wherein a light transmittance is 91.5 to 92.0%, and a water vapor transmission rate (WVTR) value of the optical adhesive film after being left at about 50° C. for about 24 hours is about 30 g/m² to 50 g/m², and
wherein the optical adhesive film is prepared by stirring and mixing the layered clay compound and a curable monomer for forming an optical adhesive film at 10,000 rpm for 30 minutes, and
wherein the cured resin is formed by polymerizing 100 parts by weight of ethyl hexyl acrylate (EHA), 50 parts by weight of isobornyl acrylate (IBOA), and 40 parts by weight of hydroxyethyl acrylate (HEA) in the presence of 3-5 parts by weight of layered clay compound.

2. The optical adhesive film of claim 1, wherein the inorganic nanoparticles have a thickness of 1 nm to 100 nm.

3. The optical adhesive film of claim 1, wherein the inorganic nanoparticles have a ratio of a thickness to a long diameter of 1:50 to 1:200.

4. The optical adhesive film of claim 1, wherein the layered clay compound includes one selected from the group consisting of mica, smectite, vermiculite, clorite, montmorillonite (MMT), nontronite, saponite, hectorite, bentonite and combinations thereof.

5. The optical adhesive film of claim 1, wherein in the layered clay compound, a hydrophilic functional group is substituted with a C12-C18 alkyl group.

6. The optical adhesive film of claim 1, wherein peaks do not exist at 2θ values of 2 to 10 degrees in X-ray diffraction (XRD) pattern using CuKα ray.

7. The optical adhesive film of claim 1, wherein a toughness is 3.5 Kg/mm² to 4.0 Kg/mm², modulus measured at room temperature is $1.15 \times 10^5$ Pa to $1.20 \times 10^5$ Pa, and peel strength is 3.0 kg/inch to 3.5 kg/inch.

8. A method for manufacturing the optical adhesive film of claim 1 comprising:
preparing an adhesive composition by mixing and stirring at 10,000 rpm for 30 minutes, an organic-substituted hydrophobic layered clay compound and a curable monomer for forming an optical adhesive film so that the curable monomer is interposed between layers of the layered clay compound; and
curing the adhesive composition to polymerize the curable monomer interposed between the layers of the layered clay compound to be a cured resin, such that the inorganic nanoparticles having a plate shape, each of which forms the layer of the layered clay compound, are delaminated so as to obtain the optical adhesive film in which the inorganic nanoparticles are dispersed in a matrix of the cured resin,
wherein the cured resin is formed by polymerizing 100 parts by weight of ethyl hexyl acrylate (EHA), 50 parts by weight of isobornyl acrylate (IBOA) and 40 parts by weight of hydroxyethyl acrylate (HEA), in the presence of 3-5 parts by weight of organic-substituted layered clay compound, wherein the inorganic nanoparticles include at least one delaminated layer of a layered clay compound, and the inorganic nanoparticles are disperesed parallel in a matrix of the cured resin to a surface of the optical adhesive film.

9. The method of claim 8, wherein the inorganic nanoparticles have a thickness of 1 nm to 100 nm.

10. The method of claim 8, wherein the inorganic nanoparticles have a ratio of a thickness to a long diameter of 1:50 to 1:200.

11. The method of claim 8, wherein the organic-substituted hydrophobic layered clay compound includes one selected from the group consisting of mica, smectite, vermiculite, chlorite, montmorillonite (MMT), nontronite, saponite, hectorite, bentonite and combinations thereof, and in the layered clay compound, a hydrophilic functional group is substituted with a C12-C18 alkyl group.

12. A touch screen panel comprising:
   a conductive plastic film having one surface on which a conductive layer is formed; and
   the optical adhesive film of claim 1, stacked on the conductive plastic film.

13. The touch screen panel of claim 12, wherein the conductive plastic film is a polyethylene terephthalate film having one surface on which a conductive metal oxide layer is formed.

\* \* \* \* \*